United States Patent [19]

Ourensma

[11] Patent Number: 4,655,253
[45] Date of Patent: Apr. 7, 1987

[54] SHUT-OFF VALVE

[75] Inventor: Jan Ourensma, Sneek, Netherlands

[73] Assignee: Appendagefabriek "Hoogeveen" BV, Sneek, Netherlands

[21] Appl. No.: 656,936

[22] Filed: Oct. 2, 1984

[30] Foreign Application Priority Data

Oct. 6, 1983 [NL] Netherlands ............... 8303437

[51] Int. Cl.[4] .............. F16K 11/14; F16K 51/00
[52] U.S. Cl. .................. 137/614.18; 137/625.67; 137/312; 137/240; 251/282
[58] Field of Search ............ 137/625.67, 625.69, 137/240, 625.48, 312, 313, 314, 237, 238, 241, 614.11, 614.13, 614.14, 614.16, 614.17, 614.18; 251/281, 282, 367

[56] References Cited

U.S. PATENT DOCUMENTS

| Re. 25,251 | 10/1962 | Quail | 251/282 |
|---|---|---|---|
| 1,224,221 | 5/1917 | Schwanebeck | 251/63 |
| 2,589,794 | 3/1952 | Frantz | 251/63 |
| 3,199,540 | 8/1965 | Forster | 251/324 |
| 3,290,003 | 12/1966 | Kessler | 251/367 |
| 4,460,014 | 7/1984 | Mases et al. | 137/614.18 |

FOREIGN PATENT DOCUMENTS 1288142 2/1962 France ............... 137/625.69

Primary Examiner—Martin P. Schwadron
Assistant Examiner—John S. Starsiak, Jr.
Attorney, Agent, or Firm—John P. Snyder

[57] ABSTRACT

The shut-off valve (1, 40, 85) comprises a valve housing (2) having at least two chambers (3, 4, 5) adjoining one another in axial direction. The chambers are communicating with one another through a passage bounded by a valve seat (6, 7). A valve body (15) is axially movable in the housing and co-operates with each valve seat for closing the associated passage. The valve body is guided with sealed passages through the walls of the axially outer chambers opposite the valve seat (6, 7). The passages and each valve seat have substantially the same diameters. The valve body can be composed of an upper valve body and a lower valve body part both being provided with a sealing ring co-operating with the same cylindrical valve seat.

11 Claims, 8 Drawing Figures

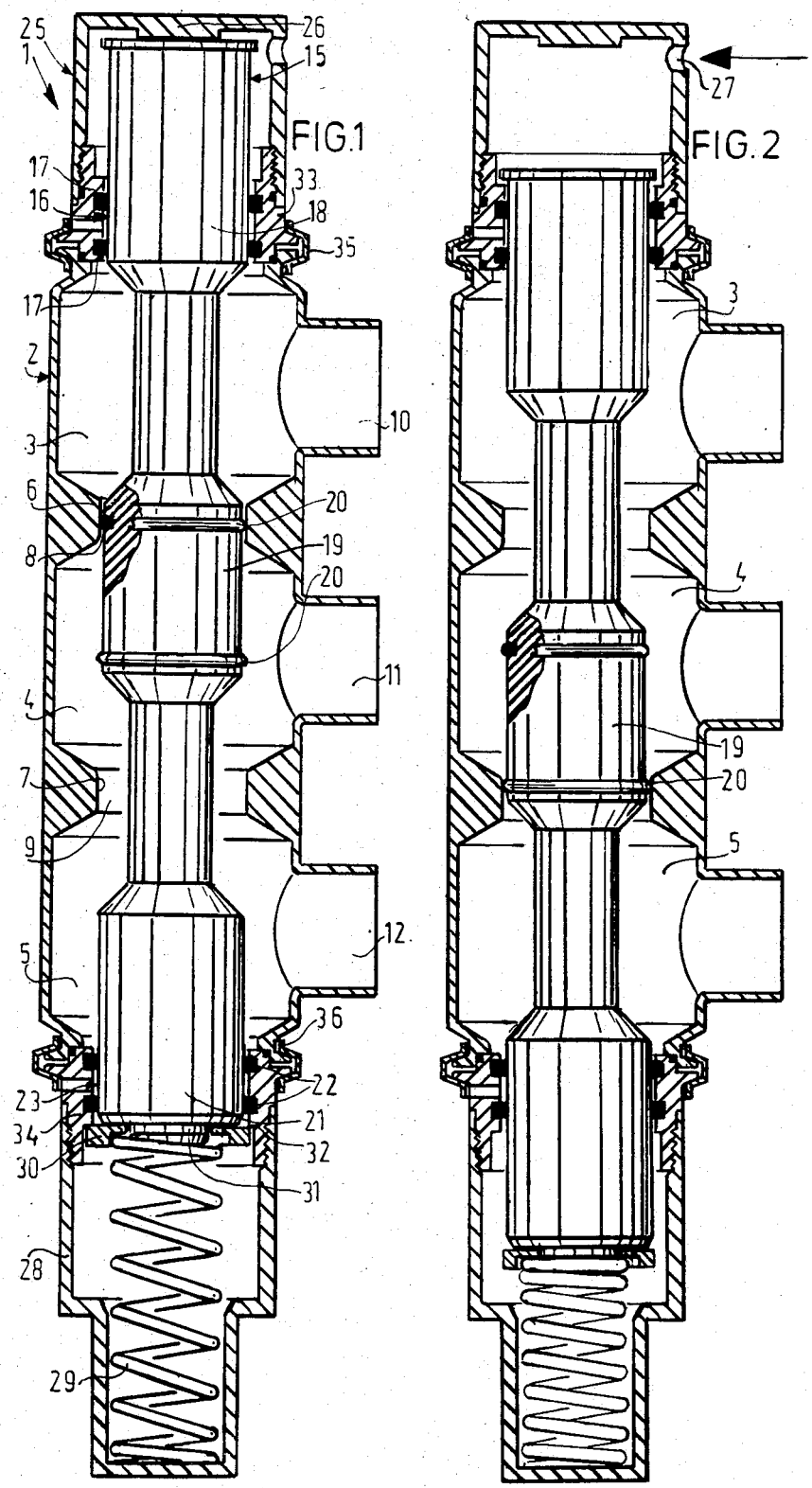

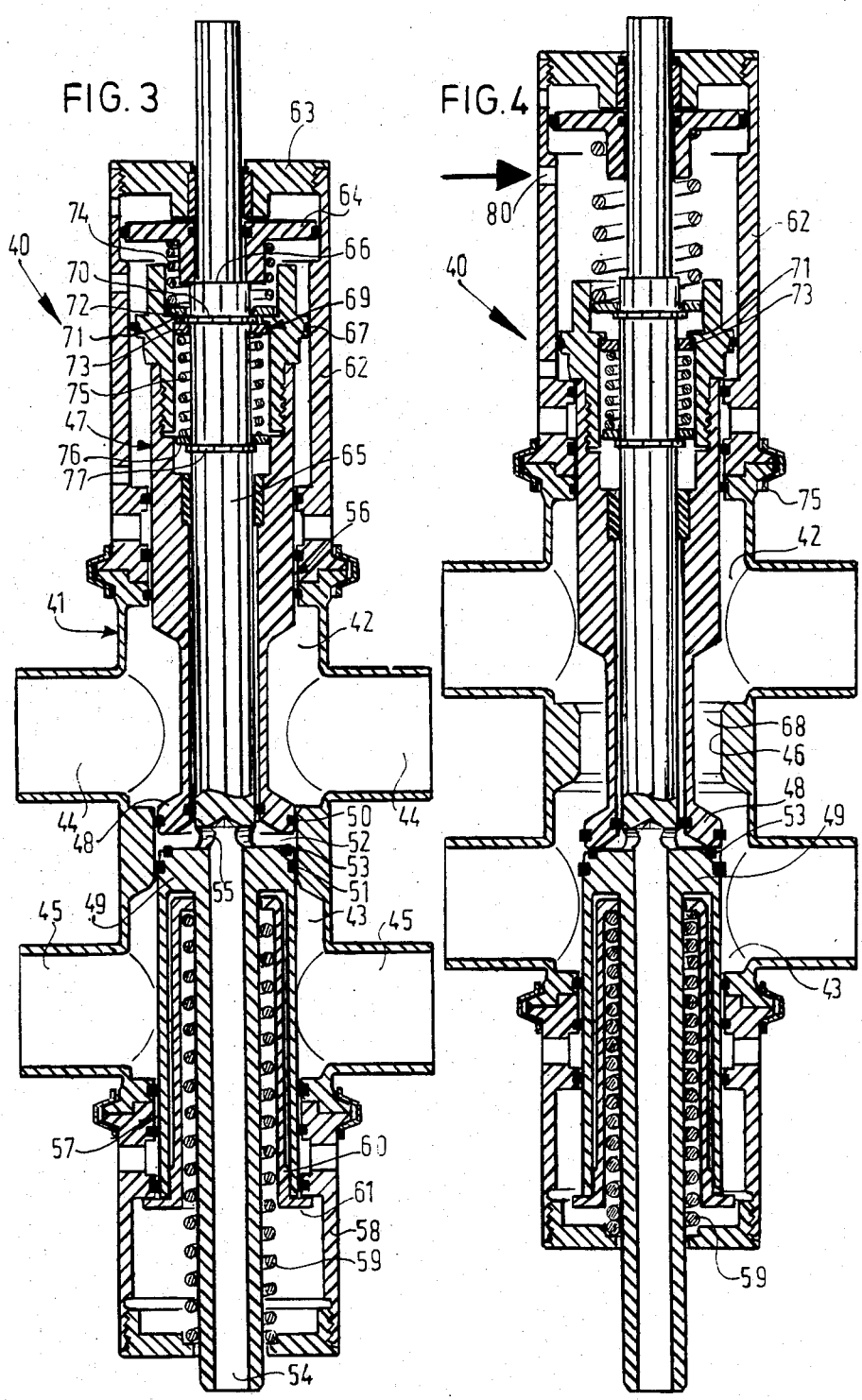

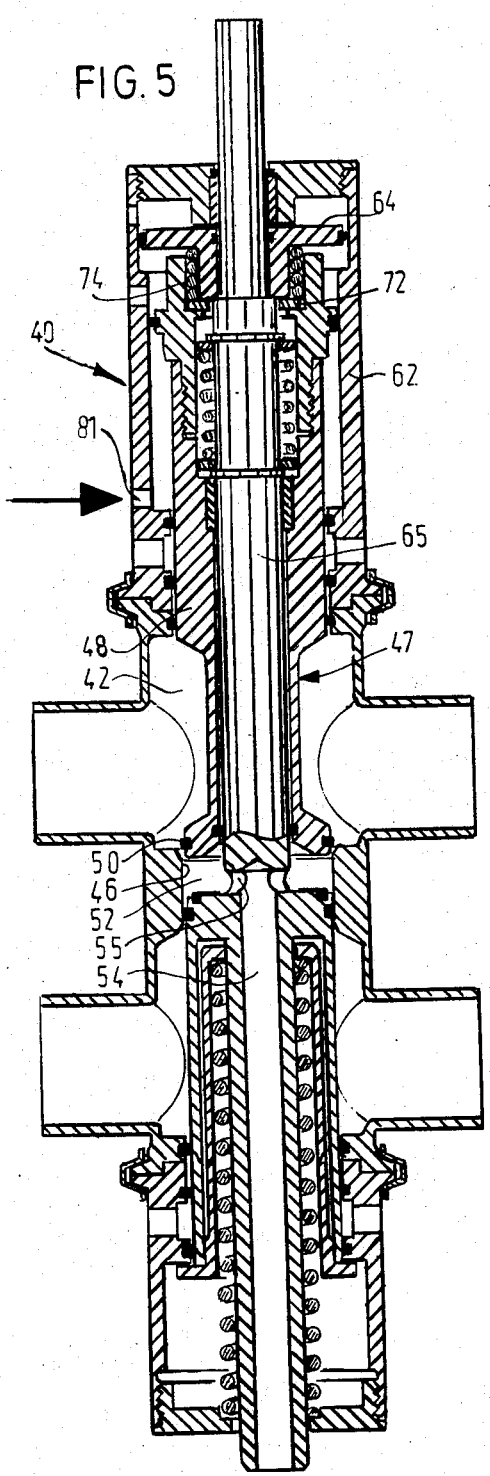
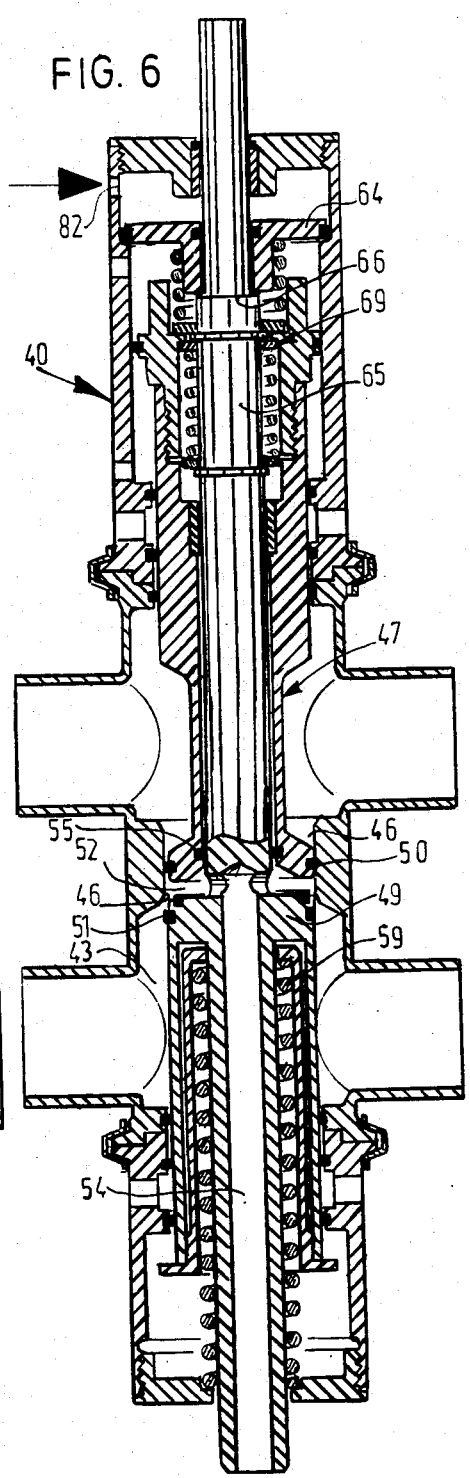

SHUT-OFF VALVE

The invention relates to a shut-off valve comprising a valve housing having at least two chambers axially communicating with one another through a passage bounded by a valve seat and being provided with ports for the inlet and the outlet of a medium, a valve body movably arranged in an axial direction in the housing and co-operating with each valve seat for closing the associated passage and a moving device engaging an end of the valve body guided through a wall of an axially outermost chamber located opposite the valve seat by a sealed passage, said valve body being guided with a sealed passage through the walls of the axially outer chambers opposite the valve seat, which passages have the same diameters, a moving device engaging an end of the valve body and stop means for defining the closed position of the valve body.

Such a shut-off valve is known from EP-A-No. 39 319. The shut-off valve shown and described in this patent specification comprises a valve body having an upper part and a lower part, said upper part comprising near the valve seat an axial seal and the lower part a radial seal capable of sealing on a cylindrical surface near the axial sealing surface or at a cylindrical surface recessed in the upper valve body part. The axial seal has a bigger diameter than the passages such that this axial valve seat defines a 20-25% bigger area than the passages. This means that for opening the valve a commanding force is necessary depending considerably upon the medium pressure in the shut-off valve. Also reaction forces on the valve body can occur with occurance of water hammer in the conduits.

The invention has for its object to provide a shut-off valve of the kind set forth in the preamble, wherein the actuation is completely independent of the pressure in the conduits and which furthermore is insensitive to pressure peaks occurring in the conduits, for example caused by water hammer.

This object is achieved in a shut-off valve according to the invention in that the valve seat is only formed by a cylindrical surface with the same diameter as the passages, said valve body carrying at least one sealing ring with its radially outer diameter co-operating with the cylindrical valve seat and in that the stop means are provided near at least one of the passing ends of the valve body. Therefore, the moving device only has to overcome the friction on the valve body at the area of the seals, and the spring force. The power required for that is low. Consequently, in the shut-off valve embodying the invention the moving device may be light, whilst the energy consumption in operation is low.

Thus an important aspect of the invention is that for obtaining a good sealing it is not necessary to press the valve body with a biasing force to the valve seat. The sealing of a sealing ring in a cylindrical valve seat surface gives a completely certain sealing. The moving device for the shut-off valve according to the invention therefore also can be light because such a biasing force does not have to be op- posed.

A particularly advantageous embodiment of the moving device is obtained when in accordance with the invention the moving device comprises a pressure chamber adjoining its sealed passage, connected with the valve housing and being provided with inlet and outlet means for the pressurized medium, in which pressure chamber protrudes the closed end of the valve body extending beyond the passage. Owing to the relatively large diameter of the passage corresponding with that of the valve seat the pressurized medium can exert sufficient force on the valve body for displacing the same. The pressure chamber thus takes the place of a conventional piston/cylinder device. No particular requirements have to be imposed on the finish of the inner surface of the pressure chamber so that by this feature of the invention a particularly cost-economic moving device is obtained.

A very favourable extra advantage of the device according to the invention is that the valve body can be removed as a whole in a simple manner out of the valve housing in axial direction, without being dismounted. It is only necessary to dismount the moving device for this purpose.

When in accordance with a further aspect of the invention the moving device is connected by at least one clamping ring with the valve housing, the moving device can be very readily dismounted from the valve housing. Then the valve body can be slipped out of the housing so that in this way the shut-off valve can be dismounted within a very short time. This is particularly important when the shut-off valve embodying the invention is used in fluid transport systems in the food and stimulant industries. In these cases the shut-off valve must be readily cleanable. This is advantageously ensured by the simple dismounting.

The shut-off valve embodying the invention can be designed in many different ways. For example, it may be a single shutter having two chambers and one valve seat therebetween. The shut-off valve embodying the invention may be a change-over shutter having three or more chambers. When a change-over shutting-off device is used in a system in the aforesaid food and stimulants industries there may occur a situation in which a product fluid flows through part of the shutter, whereas a cleaning or disinfecting fluid flows through a further part of the shut-off valve. It is then highly important that cleaning or disinfecting fluid should not mix with the product fluid. The shut-off valve described in the mentioned EP-A-No. 39 319 is of this kind in which precautions are taken to avoid such contamination of the product fluid. In a shut-off valve according to the invention in which the valve body comprises an upper part and a lower part movable with respect to the former between a relatively open and a relatively closed position, the two valve body parts each have a sealing ring co-operating with the cylindrical valve seat, the valve seat has such an axial length that in the relatively open position the two sealing rings can be in sealing relationship with the valve seat, at least one of the valve body parts has a leakage detection channel extending from outside of the valve housing as far as into the space between the two sealing rings, in which furthermore facing, substantially axial surfaces of the upper part and the lower part are provided with sealing members sealing the leakage detection channel with regard to the interior of the valve housing in the relatively closed position. If leakage occurs at one of the two sealing rings, the leaking fluid will flow away through the leakage detection channel so that a directly visible signalling of the leakage is obtained. The valve body can be moved as a whole in a manner such that only one of the sealing rings is in contact with the valve seat. By putting the valve body then in the relatively open position a liquid detergent can be passed via the space between the two sealing rings through the leakage detection channel for cleaning the same.

The invention will now be described more fully with reference to the accompanying drawings showing embodiments.

FIGS. 1 and 2 are longitudinal sectional views of a shut-off valve in the form of a change-over shutter embodying the invention in two operational positions.

FIGS. 3 to 6 are longitudinal sectional views of a shut-off valve embodying the invention with leakage detection in four different working positions.

Figure 7:
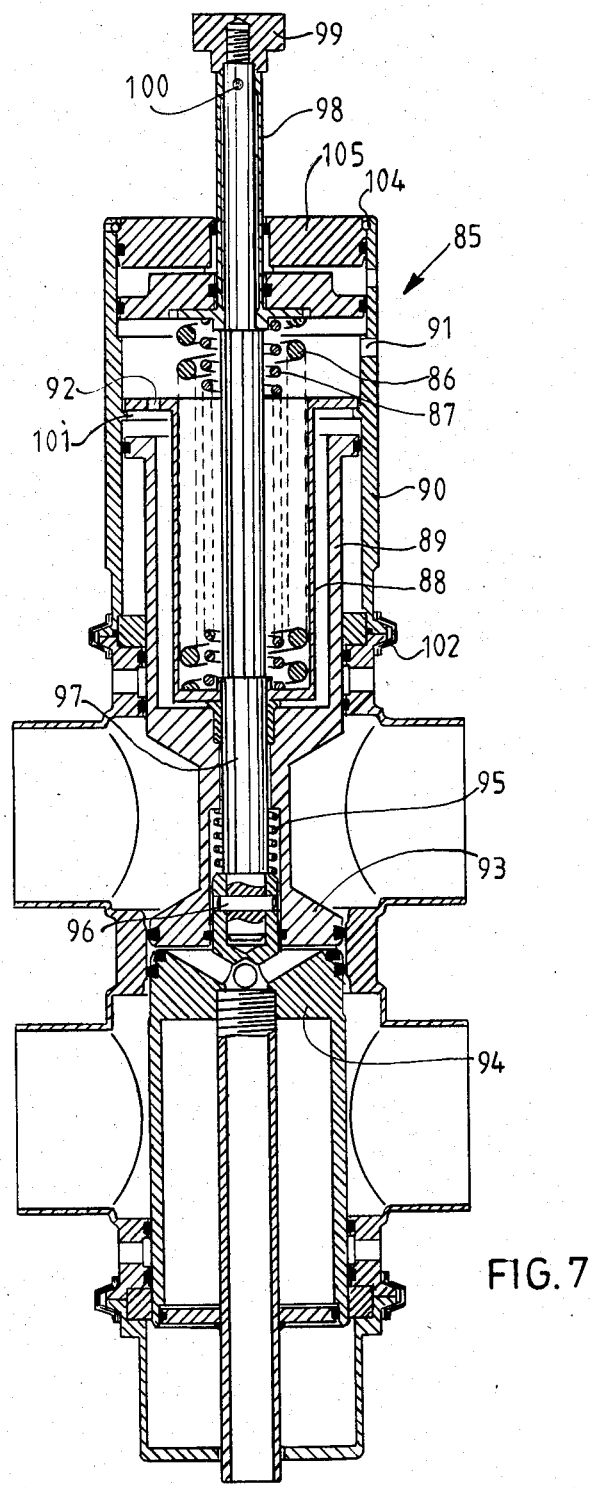
FIG. 7 is a longitudinal sectional view of a second embodiment of a shut-off valve according to the invention with leakage detection.

The shut-off valve 1 of FIG. 1 comprises a housing 2 having three axially interconnected chambers 3, 4, 5. The chambers 3 and 4 are separated from one another by a valve seat 6 bounding a passage 8, whereas the chambers 4 and 5 are separated from one another by a valve seat 7 bounding a passage 9. The chambers 3, 4, 5 have ports 10, 11 and 12 respectively for the inlet and outlet of a medium. A valve body 15 co-operates with the valve seats 6 and 7 for closing the passages 8 and 9 respectively. In the position of the valve body shown in FIG. 1 the chambers 4 and 5 communicate with one another, whereas chamber 3 is closed and in FIG. 2 the chambers 3 and 4 communicate with one another, whereas chamber 5 is closed. With the valve seat 6 co-operates an upper sealing ring 20 arranged in a valve part 19 of the valve body 15. With the valve seat 7 co-operates in a similar manner a lower sealing ring 20 in the valve part 19. By using two relatively spaced sealings in this way the stroke of the valve body can be small.

The valve body 15 is passed via a sealed passage 16 through a wall of the chamber 3 opposite the valve seat 6. In the passage 16 are arranged sealing rings 17 which co-operate with the upper end 18 of the valve body 15.

According to the invention the valve body 15 is also guided via a sealed passage 23 through a wall of the chamber 5 opposite the valve seat 7. The sealed passage 23 has sealing rings 22 co-operating with the lower passing end 21 of the valve body 15.

According to a further aspect of the invention the section of the passage 16, the valve seat 6, the valve seat 7 and the passage 23 are substantially the same.

In the position of the valve body 15 shown in FIG. 1 the pressure of the medium in the chamber 3 acts on the valve body both in upward and downward direction. The force exerted by the medium in upward direction is equal to the medium pressure multiplied by the section of the passage 16. The force exerted in downward direction is equal to the medium pressure multiplied by the diameter of the valve seat 6. Since in accordance with the invention the diameters of the passage 16 and the valve seat 6 are substantially equal to one another, the resultant of said forces is substantially equal to zero. In a similar manner the forces exerted on the valve body 15 by the pressure of the medium in the chambers 4 and 5 in upward and downward direction are equal to one another so that in total the resultant of all forces exerted by the media in the housing on the valve body 15 is at least substantially equal to zero. This is true for any arbitrary pressures in the chambers of the shut-off valve 1.

It will be obvious that also in the position of the valve body 15 shown in FIG. 2 and in any intermediate position the resultant of the forces exerted by the media on the valve body is equal to zero.

In the shut-off valve 1 shown in FIGS. 1 and 2, therefore, under all working conditions, the driving force for displacing the valve body 15 is equal to the frictional forces to be overcome at the area of the passages 16 and 23 and the valve seats 6 and 7.

The valve body 15 is displaced with the aid of a moving device 25, which comprises in the embodiment shown a compressed air device engaging the upper passing end 18 and a reset spring 29 engaging the lower passing end 21. The compressed air device is formed in accordance with the invention by a pressure chamber 26 in which the passing or piston end 18 of the valve body 15 is located. Since the passing end 18 has a relatively large diameter, a considerable downwardly directed force can be exerted on the valve body 15 by a moderate increase in pressure in the chamber 26. The pressure chamber 26 has a connection 27 for the inlet and outlet of a pressurized medium, for example compressed air.

The reset spring 29 is arranged in a spring chamber 28 connected with the valve housing 2. The reaction or return end 21 of the valve body 15 is provided with a centering shoulder 31 engaging a stop ring 30, with the underside of which the reset spring 29 is in contact. The stroke of the spring 29 is limited because the stop ring 30 comes into contact with a rim 32 of the housing 28.

In the embodiment shown the pressure chamber 25 and the spring chamber 28 are connected by screwthread with holders 33 and 34 respectively of the passages 16 and 23. The holders 33 and 34 are connected with the housing 2 of the shut-off valve 1 by means of known clamping rings 35, 36. By loosening the clamping rings 35, 36, which can be done very rapidly, the pressure chamber 26 and the spring chamber, in this case together with the passage holders 33, 34 can be disengaged from the housing. Since in the embodiment shown the valve seats 6 and 7 are cylindrical, the valve body 15 can be slipped out of the housing 2 in an axial direction. By loosenin9 the clamping rings 35 and 36 all components can be removed from the valve housing 2, which itself can be left in the duct system.

The shut-off valve 40 shown in FIGS. 3 to 6 is a single valve. It comprises a housing 41 having two chambers 42 and 43 adjoining one another in an axial direction. The chambers 42 and 43 communicate through ports 44 and 45 respectively with fluid ducts. A valve seat 46 is formed between the chambers 42 and 43. In the housing 41 a valve body 47 is axially displaceable, said body having an upper port 48 and a lower part 49 for reasons to be described hereinbelow. At the area of the valve seat 46 the upper part 48 has a sealing ring 50, whereas the lower valve body part 49 has a sealing ring 51 also at the area of the valve seat 46. The proximal surfaces of the upper valve body part 48 and the lower valve body part 49 have a sealing member 53 formed by a sealing ring in the lower part 49 cooperating with an appropriate radial face of the upper part 48. The upper part 48 and the lower part 49 can be moved into contact with one another so that the sealing member 53 seals the upper part and the lower part to form a closed unit.

FIG. 3 shows the rest position of the shut-off valve 40. In this rest position the lower valve body part 49 and the upper valve body part 48 are moved away from one another in an axial direction into a relatively open position. The cylindrical valve seat 46 has such an axial length that in said relatively open position the two sealing rings 50 and 51 are in sealing relationship with the seat 46. The lower valve body part 49 has an axial bore 54, which communicates through a transverse bore 55 with the space 52 between the sealing rings 50 and 51. If one of the sealing rings 50 or 51 does not completely shut off, medium, particularly fluid will get from the chambers 42 or 43 into the space 52. From this space 52 the medium flows through the transverse bore 55 into the leakage detection channel 54. The leaking medium emerges at the lower end from the leakage detection channel 54 so as to become visible so that the presence of leakage is signalled. In this way medium flowing through the ducts connected with the gates 44 is prevented from mixing with medium flowing ducts connected with the gates 45 or conversely. In a transport system in food and stimulants industries one of said ducts may pass product fluid and the other duct may pass a cleansing fluid. A clear example is the dairy industry in which the shut-off valve 40 is used, for example, in a milk processing device. In such a device the ducts have to be repeatedly cleaned in order to avoid the growth of lactic acid bacteria in milk residues.

According to the invention also in the shut-off valve 40 the valve body 47 is guided at the top through a passage 56 and at the underside through a passage 57. The diameters of the passages 56 and 57 and those of the valve seat 46 are substantially equal to one another. In this way the equalization of the forces described above is ensured.

The valve body 47 is held in the rest position shown in FIG. 3 by means of the reset spring 59. The lower end of the reset spring 59 bears on a head wall of the spring chamber 58 connected with the housing 41 of the shut-off valve. The top end of the reset spring bears on an end of a spring sleeve 60, the lower stop rim 61 of which bears on the lower rim of the lower valve body part 49. By arranging the reset spring 59 in this way partly in the valve body 47 the axial structural length of the shut-off valve is reduced.

The moving device for the shut-off valve 40 also comprises a cylinder 62 arranged on the top side of the housing 41, which may be a compressed air cylinder. The cylinder 62 has a cover 63 on the top side. The cylinder 62 is double acting and its upper part comprises an auxiliary piston 64, the function of which will be described hereinafter. The lower valve body part 49 is provided with a rod 65 extending upwards through an axial bore of the upper valve body part 48. Said rod has a shoulder 66, which is in contact with the lower end of the auxiliary piston 64. In the rest position shown in FIG. 3 the lower valve body part 49 is urged into its upper end position by the reset spring 59. Thus this upper end position is determined by the contact of the shoulder 66 of the rod 65 with the auxiliary piston 64, which in turn is then in contact with the cover 63 of the cylinder 62.

The relatively open position of the upper valve body part 48 with respect to the lower valve body part 49 is determined by yielding stop means 69. In a preferred embodiment of the invention said means comprise a radially projecting collar 71 on the upper valve body part 48, a collar 70 formed by a circlip or snap ring covering substantially the same radial distance opposite the collar 71 and arranged on the rod 65 of the lower valve body part 49 and a pressure ring 72 engaging on the top side the two axial head faces of the collars 70, 71 and a pressure ring 73 engaging on the underside the two lower axial head faces of the collars 70, 71. The pressure ring 72 is spring-loaded in downward direction by a compression spring 74, which bears on the auxiliary piston 64. The lower pressure ring 73 is spring-loaded in upward direction by a compression spring 75, which is supported by the rod 65 via a ring 76 and a circlip or snap ring 77. Owing to the yielding stop means 69 the upper valve body part 48 is resiliently fixed in the relatively open position with respect to the lower valve body part 49. An upward movement of the part 48 with respect to the part 49 is counteracted by the spring 74, whereas a downward movement is counteracted by the spring 75.

The operation of the shut-off valve 40 will now be described in detail with reference to FIGS. 4 to 6. For displacing the valve body 47 from the rest position shown in FIG. 3 into the open position of FIG. 4 a pressurized medium, for example, compressed air is fed through the port 80 to the cylinder 60. The pressure exerted by this compressed air urges the upper valve body part 48 downwards. The valve body part 48 is provided at the top end with a sealing ring 67, which co-operates with the inner wall of the cylinder 62. In accordance with the invention the force exerted by the spring 75 is lower than the force exerted by the reset spring 59. As a result, as soon as the upper valve body part 48 is downwardly urged by the compressed air, first the upper valve body part 48 moves down with respect to the lower valve body part 49 until the bottom face of the former is in contact with the valve member 53. At this instant the lower valve body part 49 is still in the position shown in FIG. 3 for this part, that is to say, the sealing ring 51 is in contact with the valve seat 46. Upon further supply of the compressed air through the port 80 the upper valve body part 48 is further pushed down so that the lower valve body part 49 is carried along. This movement continues until the rim of the upper valve body part with the seal comes into contact with a rim below in the cylinder 62. This is the open state shown in FIG. 4. In this position the passage 68 is free so that medium can flow from the chamber 42 to the chamber 43 or vice versa.

When the shut-off valve 40 has to be returned to the closed position, the pressure in the cylinder 62 is allowed to escape so that the reset spring 59 moves the whole valve body upwards. As soon as the rim 66 of the rod 65 comes into contact with the underside of the auxiliary piston 64, the movement of the lower valve body part 49 is stopped and the upper valve body part 48 moves slightly further upwards under the action of the spring 75.

When, as in the former example, in the open position milk is flowing through the shut-off valve, some milk residue will be left, after the device is closed, in the space between the two sealing rings 50 and 51. In order to avoid an undesirable development of lactic acid bacteria in this milk residue, the space 53 and the leakage detection channel 54 communicating therewith can be flushed in the shut-off valve 40 embodying the invention simultaneously with flushing the ducts connected with the ports 44 or 45.

FIG. 5 shows the situation in which the leakage detection spaces 52, 54 and 55 are flushed, whilst the chamber 42 is flushed and FIG. 6 shows the situation in which the leakage detection spaces are flushed whilst the chamber 43 is flushed.

The situation of FIG. 5 is obtained out of the situation of FIG. 3 by feeding pressurized medium, for example, compressed air to the port 81 of the cylinder 62. By this compressed air the upper valve body part 48 is urged upwards in the cylinder 62 against the force of the spring 74 until the part 48 comes into contact via the pressure ring 72 with the auxiliary piston 64. With this upward movement the sealing ring 50 gets free of the valve seat 46 so that a communication is established between the chamber 42 and the space 52. Then a cleaning fluid can flow from the chamber 42 through the space 52, the transverse bore 55 and the leakage detection channel 54 to the outside. Thus said spaces are cleaned. By eliminating the pressure the upper valve body part 48 returns into the position shown in FIG. 3 by the action of the spring 74.

By feeding a pressurized medium, for example, compressed air through the port 82 the auxiliary piston 64 is moved downwards. By the contact of the auxiliary piston 64 with the shoulder 66 of the rod 65 of the lower valve body part 49 the lower valve body part 49 is also moved downwards. By the above-described yielding stop means 69 the upper valve body part 48 is carried along at the same time. Thus the valve body 47 as a whole is moved downwards. The sealing ring 50 remains in contact with the valve seat 46 so that the chamber 42 remains blocked. However, the sealing ring 51 gets free of the valve seat 46 so that a communication is established between the chamber 43 and the space 52. The cleansing fluid can again flow from the chamber 43 through the chamber 52, the transverse bore 55 and the leakage detection channel 54 to the outside so that these spaces are cleaned. By allowing the pressure to flow away the valve body 47 as a whole is returned by the reset spring 59 into the position shown in FIG. 3.

In the shut-off valve 40 the parts of a moving device are again connected by means of clamping rings with the housing 41. By loosening the clamping rings the shut-off valve 40 can be dismounted in a simple manner, whilst the housing 41 remains in the duct system. In this way replacement of sealing rings or supplementary cleaning operations can be very rapidly carried out.

The shut-off valve 85 shown in FIG. 7 is for a substantial part similar to the shut-off valve shown in Figs. 3-6. Therefore, only the differences of the valve 85 with the valve 40 will be described.

The moving device as a whole is provided at the upper side of the shut-off valve. The return spring, which is composed of a spring 86 and a spring 87 arranged therein, is contained within the cylinder 90. The lower valve part 94 is connected to the valve shaft 97 by means of a pin 96. A sleeve 98 is arranged on the end of the valve shaft 97 extending above the cylinder 90, which sleeve 98 is rigidly connected with the shaft by means of a nut 99 and a lock pin 100. At its lower end the sleeve 98 has a flange against which the springs 86 and 87 bear. The springs 86 and 87 are contained in a spring sleeve 88 resting with an upper flange on a collar 101 in the cylinder 90. The spring 95 for forcing the valve parts 94 and 93 in the relatively opened position is arranged near the lower end of the valve shaft 97. The spring 95 bears with its upper end against a collar in the upper valve part 93 and with its lower end on an upper surface of the lower valve part 94.

For opening the valve through the port 91 pressure medium is supplied into the cylinder 90. This pressure medium flows through the opening 92 in the upper flange of the spring sleeve 88 to the space above the main piston 89. Firstly the spring 95 is compressed, whereby the two valve parts 93 and 94 come into contact with one another. With the further stroke of the main piston the upper valve part 93 carries along the lower valve part 94 against the biasing force of the springs 86 and 87.

Establishing the two flushing positions, corresponding with the positions of the valve 40 as shown in FIG. 5 and FIG. 6 is effected in corresponding way by bringing pressure under the main piston 90 or loading the auxiliary piston respectively.

Figure 8:
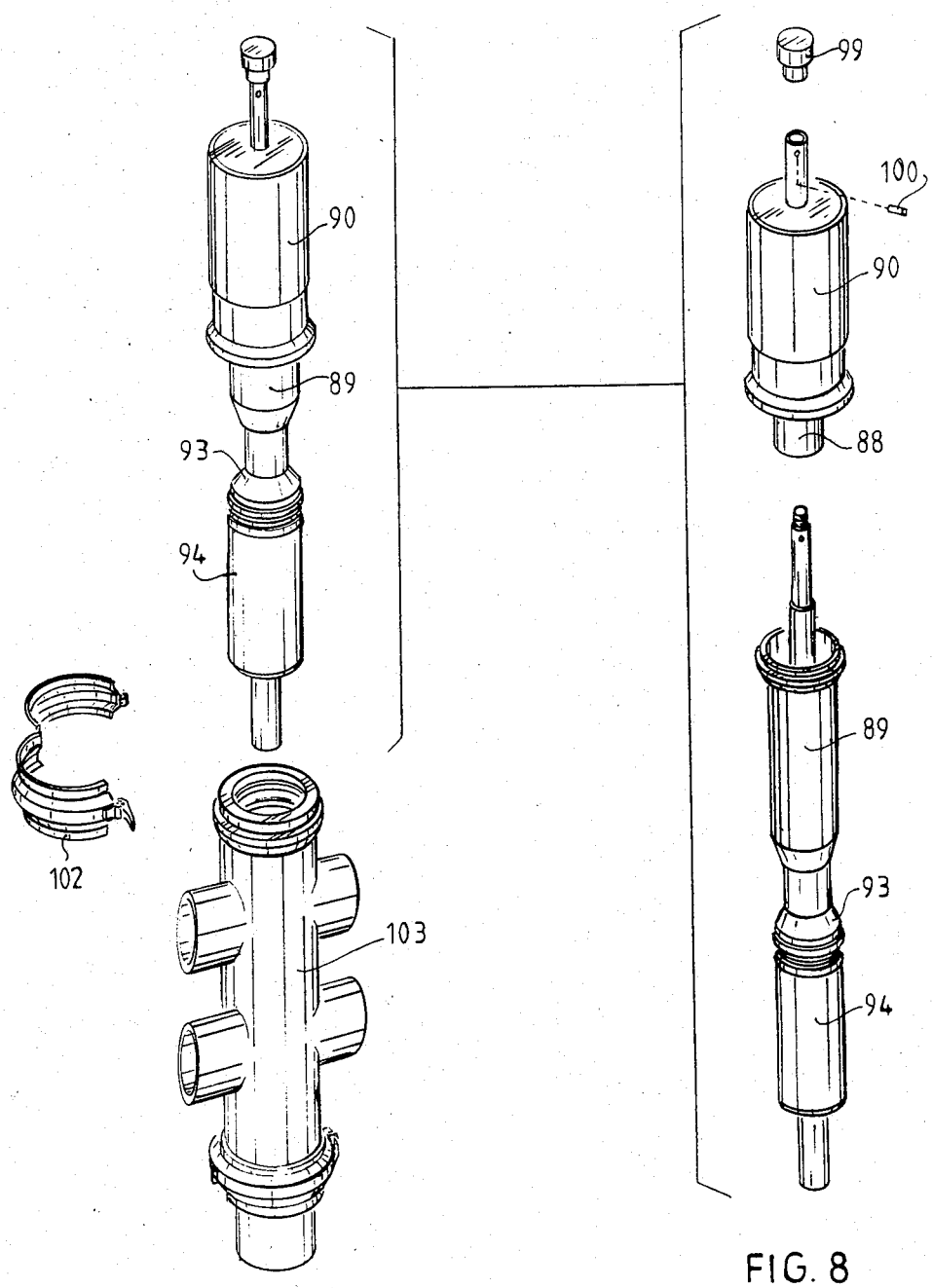
FIG. 8 is an exploded view of the shut-off valve of FIG. 7.

By simply loosening the clamp ring 102 the complete valve body with moving device can be taken from the valve body 103, as is shown in FIG. 8. The moving device contained in the cylinder 90 can be released from the valve body by removing the locking pin 100 and unscrewing the nut 99. Next the valve body part 94 can directly be slided off the valve part 93. The shaft 97 can be simply released from the lower valve part 94 by removing the pin 96 shown in FIG. 7. Next the moving device can further be dismounted by pressing the cover 105 downwardly after which the circlip 104 can be removed. This cover, the auxiliary piston, the sleeve 98, the springs and the spring sleeve are released thereby.

The shut-off valve 85, therefore, can be taken apart with only a few motions of the hand, in an instant. Replacement of sealing rings and cleaning of the assembly therefore become possible very simply and swiftly.

It will be obvious that a change-over shut-off valve of the kind shown in FIGS. 1 and 2 can also be designed with the possibility of leakage detection like in the shut-off valve 40 of FIGS. 3 to 6. As stated above, an advantage of the invention is that it can be applied to different types of shut-off devices.

What is claimed is:

1. A shut-off valve comprising the combination of a valve housing having opposite end passages and including an enlarged upper chamber and an enlarged lower chamber and ports communicating respectively with said chambers, said housing also including a valving passage between said chambers, said passages all being of substantially the same diameter and a valve body having discrete first and second portions sealingly cooperative with said passages and axially slidable in said housing between a shut-off position in which adjacent parts of the first and second portions project within the valving passage and in circumferentially sealing contact therewithin so that the valving passage is blocked and an open position in which said adjacent parts of the first and second portions are out of the valving passage and out of circumferentially sealing contact therewithin so that said valving passage is unblocked to communicate said chambers, said first and second portions being coaxially aligned, said second portion being hollow to define a conduit extending exteriorly of said housing, said second portion having an opening communicating said conduit with a space between said adjacent parts of said first and second portions, said space being surrounded by and within said valving passage between the circumferential seals between the first and second portions and the valving passage when said valve body is in said closed position thereof to prevent flow between said ports in the event of sealing failure at said valving passage when the valve body is in said closed position thereof.

2. A shut-off valve as defined in claim 1 including resilient means for normally separating said portions to define said space when said valve body is in the closed position thereof, and means operable when said valve body is in the closed position thereof for axially shifting one of said portions relative to the other portion to increase the space between said portions and communicate said first chamber with said conduit and for axially shifting both of said portions to communicate said second chamber with said conduit.

3. A shut-off valve as defined in claim 2 including means for automatically urging said portions into engagement when said valve body is moved to said open postion thereof.

4. A shut-off valve comprising the combiantion of a valve housing having an axial bore defining two axially spaced chambers in which a first chamber is axially separated from a second chamber by an axially extending valve seat passage of cylidrical form, said housing also having two axially extending sealing passages of cylindrical form having the same diameter, one of said sealing passages being located axially beyond said first chamber and the other of said sealing passages being located axially beyond said second chamber, first fluid passage means connected with said first chamber. second fluid passage means connected with said second chamber, a spool-type valve body axially slidable in said axial bore, said valve body having one end portion of enlarged cylindrical form having substantially the same diameter as said one of said sealing passages and axially slidable therewithin and there being means cooperating between said one sealing passage and said one end portion for effecting a circumferntial seal therebetween, said valve body having a second end portiong of enlarged cylindrical form having substantially the same diameter as said other sealing passage and axially slidable therewithin and there being means cooperating between said other sealing passage and said second end portion for effecting a circumferential seal therebetween, said valve body having a valving portion of enlarged cylindrical form between said end poritons and having substantially the same diameter as said valve seat passage and there being means cooperating between said valving portion and said valve seat for effecting a circumferential seal therebetween, reset means for urging said valve body axially in one direction to a first position within said housing blocking communication between said chambers through said vlave seat passage, moving means for urging said valve body axially in that direction opposite to said one direction to a second position within said body unblocking communication between said chambers through said valve seat passage, said one end portion of the valve body being separate from said other end portion, said end portions being axially slidable with respect to each other and there being means for separating said end portions to define a gap therebetween at said valving portion, said other end portion being hollow to define a conduit and having an opening communicating said conduit with said gap, and means for increasing said gap when said valve body is in said first position thereof to shift said one portion out of said valve seat passage and communicate said first chamber with said conduit and for shifting both of said end portions to communicate said second chamber with said conduit.

5. A valve construction comprising the combination of a valve housing having upper and lower axially spaced chambers and a cylindrical valving passage interconnecting the chambers and defining a valve seat therebetween, an inlet port communicating with one of the chambers and an outlet port communicating with the other of the chambers, a valve body extending axially through said valve body, said valve body comprising an upper part having a lower portion normally disposed within the confines of said valve seat and there being a first sealing ring between the lower portion of the upper part and the valve seat, said valve body also including a lower part having an upper portion normally disposed within the confines of said valve seat and there being a second sealing ring between the upper portion of the lower part and the valve seat, said upper and lower parts being axially shiftable with respect to each other and to the valve body and presenting opposed, proximal surfaces which are spaced apart in the normal dispositions of the upper and lower parts to define a drain chamber therebetween which communicates with the space between said sealing rings, said lower part having a drain passage communicating with said drain chamber, a third sealing ring between said proximal surfaces, yieldable stop means operating between said upper and lower parts for urging them apart so that one of said proximal surfaces normally is out of contact with said third sealing ring, reset spring means axially urging said lower part upwardly into said normal disposition thereof, and a moving device for axially urging said upper part downwardly to compress said yieldable stop means to sandwich said third sealing ring between said proximal surfaces and position both said upper and lower parts in said lower chamber so that the upper and lower chambers are communicated through said valving passage.

6. A valve construction as defined in claim 5 wherein said moving device includes a cylinder on the upper end of said housing and receiving a portion of said upper part.

7. A valve construction as defined in claim 5 wherein said reset spring means comprises a spring chamber on the lower end of said housing and a reset spring seated in said spring chamber and engaging said lower part.

8. A valve construction as defined in claim 7 wherein said reset spring is partially recessed within said lower part.

9. A valve construction as defined in claim 5 wherein said moving device includes a cylinder on the upper end of the housing and receiving an upper end of said upper part, a main piston carried by said upper end of the upper part, an auxiliary piston within said cylinder above said main piston and spring means between said main and auxiliary piston. said cylinder being provided with first, second and third ports respectively below and above said main pistion and above said auxiliary piston so that pressure medium introduced through said second port urges the upper part downwardly to compress said yieldable stop means and position both the upper and lower parts in the lower chamber, so that pressure medium introduced through said first port raises said upper part to compress said spring means and position said upper part into the upper chamber to expose the drain chamber therein, and so that pressure medium introduced through said third port urges said auxiliary piston downwardly to shift both the upper and lower parts downwardly such that the lower part is diposed in said lower chamber to expose said drain chamber therein.

10. A valve construction as defined in claim 9 wherein said reset spring means comprises a spring chamber on the lower end of said housing and a reset spring seated in said spring chamber and engaging said lower part.

11. A valve construction as defined in claim 10 wherein said reset spring is partially recessed within said lower part.

* * * * *